US005574750A

United States Patent [19]

Peponides et al.

[11] Patent Number: 5,574,750
[45] Date of Patent: Nov. 12, 1996

[54] METHODS AND APPARATUS FOR DETECTING A CELLULAR DIGITAL PACKET DATA (CDPD) CARRIER

[75] Inventors: George Peponides, Encinitas; Kumar Balachandran, San Diego, both of Calif.

[73] Assignee: Pacific Communication Sciences, Inc., San Diego, Calif.

[21] Appl. No.: 121,339

[22] Filed: Sep. 14, 1993

[51] Int. Cl.$^6$ .............. H04B 3/46; H04B 1/04; H03D 1/00; H04L 7/00
[52] U.S. Cl. .......... 375/224; 375/340; 375/341; 375/354; 455/132; 455/133
[58] Field of Search ............... 375/224, 340, 375/341, 354, 355; 455/132, 133

[56] References Cited

U.S. PATENT DOCUMENTS

| | | | |
|---|---|---|---|
| Re. 34,034 | 8/1992 | O'Sullivan | 379/59 |
| 3,927,259 | 12/1975 | Brown | 179/1 |
| 3,927,260 | 12/1975 | Amundson et al. | 179/1 |
| 4,141,072 | 2/1979 | Perreault | 364/553 |
| 4,189,677 | 2/1980 | Cooper et al. | 325/321 |
| 4,222,115 | 9/1980 | Cooper et al. | 375/1 |
| 4,763,322 | 8/1988 | Eizenhofer | 370/95 |
| 4,797,931 | 1/1989 | Furukawa et al. | 351/56 |
| 4,799,252 | 1/1989 | Eizenhoffer et al. | 379/59 |
| 4,941,155 | 7/1990 | Chuang et al. | 375/84 |
| 4,949,973 | 7/1990 | Werner | 375/1 |
| 4,984,247 | 1/1991 | Kaufmann et al. | 375/1 |
| 5,020,076 | 5/1991 | Cahill et al. | 375/5 |
| 5,047,772 | 9/1991 | Ribner | 341/156 |
| 5,056,109 | 10/1991 | Gilhousen et al. | 375/1 |
| 5,058,134 | 10/1991 | Chevillat et al. | 375/39 |
| 5,065,411 | 11/1991 | Muto | 375/100 |
| 5,073,900 | 12/1991 | Mallinckrodt | 375/1 |
| 5,084,891 | 1/1992 | Ariyavisitakul et al. | 371/42 |
| 5,088,108 | 2/1992 | Uddenfeldt et al. | 375/12 |
| 5,093,840 | 3/1992 | Schilling | 375/1 |
| 5,097,507 | 3/1992 | Zinser et al. | 381/31 |
| 5,103,459 | 4/1992 | Gilhousen et al. | 375/1 |
| 5,109,390 | 4/1992 | Gilhousen et al. | 375/1 |
| 5,109,528 | 4/1992 | Uddenfeldt | 455/33.2 |
| 5,150,377 | 9/1993 | Vannucci | 375/1 |
| 5,157,661 | 10/1992 | Kanai et al. | 370/95.1 |
| 5,159,624 | 10/1992 | Makita | 379/57 |
| 5,184,347 | 2/1993 | Farwell et al. | 370/94.1 |
| 5,187,719 | 2/1993 | Birgenheier et al. | 375/10 |
| 5,195,090 | 3/1993 | Bolliger et al. | 370/94.1 |
| 5,195,091 | 3/1993 | Farwell et al. | 370/94.1 |
| 5,203,024 | 4/1993 | Yamao | 455/133 |
| 5,206,882 | 4/1993 | Schloemer | 375/1 |
| 5,353,307 | 10/1994 | Lester et al. | 375/14 |

*Primary Examiner*—Edward Coles
*Assistant Examiner*—Allan A. Esposo
*Attorney, Agent, or Firm*—Woodcock Washburn Kurtz Mackiewicz & Norris

[57] ABSTRACT

Disclosed herein are methods and apparatus for detecting the presence of a CDPD carrier in a channel of a cellular system (although the invention is broadly applicable to detecting a specific kind of carrier associated with an "overlay" system, wherein an "overlay" system is one that shares the frequency allocation of another system on a non-cooperating basis). This specification describes a spectral estimation technique for detection of a CDPD carrier. In addition, this specification describes an MMSE (minimum mean-squared error) method that improves on the spectral estimation method.

11 Claims, 7 Drawing Sheets

DEMODULATED SIGNAL

DECISION DEVICE

METHODS AND APPARATUS FOR DETECTING A CELLULAR DIGITAL PACKET DATA (CDPD) CARRIER

FIELD OF THE INVENTION

The present invention relates generally to methods and apparatus for detecting a specific kind of carrier associated with an "overlay" system. An "overlay" system is one that shares the frequency allocation of another system on a non-cooperating (and non-competing) basis. One presently preferred application of the present invention is in connection with detecting a Cellular Digital Packet Data (CDPD) carrier, where the CDPD system constitutes an overlay system vis-a-vis an associated cellular telephone system. This embodiment is described herein as one exemplary application of the present invention. However, except where they are expressly so limited, the claims appearing at the end of this specification are intended not to be limited to embodiments for detecting CDPD signals.

BACKGROUND OF THE INVENTION

The CDPD system enables wireless transmission of data over existing cellular systems, such as the Advanced Mobile Phone System (AMPS). The CDPD system was designed to provide data communications in the cellular frequency range without impeding voice communications. The system uses "mobile" telephone channels just as a modem uses a telephone line but it is designed to jump from one frequency to another when necessary, i.e., when a new telephone call starts in the cell.

The first live demonstrations of CDPD took place in early 1993. Advocates for CDPD believe the technology will be inexpensive and cost effective because it builds on top of existing cellular infrastructure and does not require any additional spectrum allocation. Instead of requiring additional frequencies for data communications, CDPD uses temporal "gaps" that occur between voice calls to send data in bursts. (A voice call involves the period of time between the dialing of a number or reception of a call to hang-up of the handset on either terminal unit.) Technology has been developed to "frequency hop" and seek out gaps in cellular conversations in the cellular spectrum. The frequency-hopping technology is expected to be sufficiently robust to handle the designed data transfer rate (19.2 kbps) in crowded cellular markets.

In addition, new personal wireless communications products have been, and are being, designed to employ CDPD technology in combining all-purpose mobile communications with the technology of cellular phones, fax machines, modems, electronic mail, and pen computing. Such products will provide expanded communication capabilities to users.

Therefore, using existing hardware technology as a building block, CDPD will allow data to be transmitted across existing cellular networks, enabling idle voice time on cellular systems to be filled with packets of data. CDPD technology, with a data transmission rate of 19.2 kbps, is up to four times faster than competing wireless services. However, one of the requirements of a CDPD system is the capability of a mobile unit or base station unit to efficiently (i.e., quickly and reliably) identify a CDPD transmission.

SUMMARY OF THE INVENTION

An object of the present invention is to provide methods and apparatus for detecting the presence of a specific kind of signal of an overlay system (e.g., a CDPD forward channel) among all the channels of interest, which may be large in number, depending on the system associated with the overlay system. For example, there may be up to one thousand channels of interest to an overlay CDPD system associated with a cellular system. This specification describes a spectral estimation technique for detection of a CDPD carrier. In addition, this specification describes a second method that improves on the spectral estimation method. The second method in preferred embodiments is a minimum mean-squared error (MMSE) method. The spectral estimation method of the present invention involves "shortlisting" the number of channels scanned to a smaller number of occupied channels. In this respect, the spectral estimation method is like another proposed CDPD detection method (hereinafter sometimes referred to as the "RSSI method") that uses RSSI information to "shortlist" the number of channels scanned to a smaller number of occupied channels. RSSI stands for Receive Signal Strength Indicator. It is a common parameter measured in cellular and similar communication devices to determine quality of the received signal for the purpose of choosing the best amongst a set of candidate channels, determining candidate channels for handoff, or performing similar maintenance functions. It could be used as a method to determine whether a given channel is occupied by a signal of any kind or it is vacant. According to the RSSI method, the mobile unit tries to identify the CDPD channel by synchronizing and decoding each of the shortlisted channels. One could detect the presence of a CDPD (or like) signal on a given channel by first attempting to receive on that channel as if indeed the signal was there (i.e., synchronize to the incoming signal), collect a set of bits that form an encoded word, attempt to decode that word, and decide whether the signal was of the right type based on the results of the decoding process. The problem with this approach is that it takes a long time to synchronize to the signal, collect enough bits to form a word and decode the word to make a determination about the signal. The purpose of the second method disclosed herein is to provide a suitable alternative to this "shortlisting" method.

The spectral estimation method detects an overlay signal in a channel of a primary system, wherein the primary system has a plurality of channels in which the overlay signal might be present at any given time, and wherein the overlay signal possesses a characteristic frequency, such as the symbol clock frequency. The method comprises the steps of (a) identifying which, if any, channel(s) of the primary system are occupied by a signal; and identifying which, if any, of the signal(s) in the channel(s) identified in step (a) are an overlay signal from the overlay system. Step (b) comprises performing a non-linear operation on each signal to enhance a spectral component of the signal at the carrier frequency, and making a decision as to whether the signal is an overlay signal on the basis of the enhanced spectral component.

In presently preferred embodiments of the invention, the overlay signal is a cellular digital packet data (CDPD) signal and the primary system is a cellular telephone system.

In addition, in presently preferred embodiments, step (a) further comprises, with respect to each channel, the substeps of (1) receiving signal and noise components in the channel; (2) processing the received components to enhance noise components without a prescribed spectral band relative to noise components within the prescribed spectral band; (3) computing the ratio of spectral components within the prescribed spectral band to the enhanced spectral components without the prescribed spectral band; (4) comparing the ratio to a prescribed threshold value; and (5) identifying the channel as carrying a signal if the ratio exceeds the threshold.

The second inventive method disclosed herein comprises the steps of (a) sampling signals in at least one channel to obtain a prescribed number of samples for the at least one channel; (b) computing an error value for each sample on the basis of the difference, if any, between the sample value and the expected value; (c) determining a minimum error value; (d) determining an average of at least two error values; (e) determining a ratio of the minimum error value to the average; and (f) making a decision as to whether the signal is an overlay signal on the basis of the ratio. In presently preferred embodiments of the second method, the error values are mean-squared error (mse) values.

BRIEF DESCRIPTION OF THE DRAWINGS

FIGS. 2A–2C illustrate a simulation employing the inventive techniques disclosed herein.

FIGS. 3A and 3B depict processing techniques discussed below.

FIGS. 4A–4C illustrate the minimum mean-squared error (MMSE) processing technique, the second method disclosed herein.

DETAILED DESCRIPTION OF PREFERRED EMBODIMENTS

Figure 1:
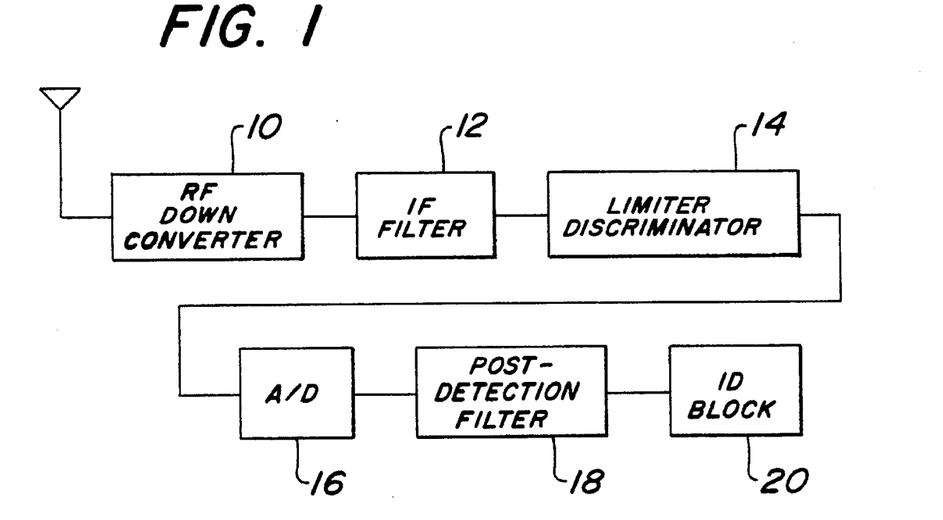
FIG. 1 is a block diagram of the receiver of a mobile cellular telephone unit, which is one preferred environment for the present invention.

FIG. 1 is a block diagram of the receiver of a mobile subscriber unit (i.e., a cellular telephone capable of receiving a CDPD signal), which represents one presently preferred embodiment of the present invention. As shown, the mobile unit comprises an RF (radio frequency) converter 10, IF (intermediate frequency) filter 12, limiter-discriminator 14, analog-to-digital (A/D) convertor 16, post-detection filter 18, and identification block 20. According to the present invention, the identification block 20 comprises means for detecting a CDPD carrier in accordance with one of the two methods described below. All components, with the exception of the identification block 20, are generally well known to those skilled in the art. Therefore, details of blocks 10–18 are described herein only as necessary to explain the present invention.

A. Method 1: Spectral Estimation Detection

The spectral estimation detection method provides signal processing solutions through manipulation of a demodulated signal received by a mobile or base station unit. The present inventors have broken the detection problem into two parts. The first part involves the detection of any signal on the channel, and the second part involves the identification of a CDPD signal among occupied channels. The next section describes a signal detection technique that will identify channels that are occupied by signals that have a prescribed signal strength or greater. This method serves as an alternative to scanning the RSSI over a given set of channels. It may be performed within a time frame of 50 bit intervals (2.6 ms), which is comparable to that proposed for the RSSI method.

A description of the CDPD detection problem is provided after the description of the technique for identifying occupied channels. Processing techniques that will yield good discrimination between the various signals in the channel are described. A simulation is then described and the simulation results are tabulated.

Signal Detection (Identification of Occupied Channels)

The CDPD signal detection problem may be formulated as a hypothesis testing problem (see, H. L. Van Trees, *Detection, Estimation and Modulation Theory, Part I*, Wiley, 1968):

$$H_0: r(t) = n(t) \tag{1a}$$

$$H_1: r(t) = F[s(t)] + n(t) \tag{1b}$$

The received signal may be noise n(t) or a combination of signal s(t) and noise. Since there is a possibility that the signal is transmitted or received by a mobile unit, the operator F represents Rayleigh fading.

The signal s(t) is a GMSK signal of the form:

$$s(t) = \sqrt{\frac{2E}{T}} \cos\left[2\pi f_c t + 2\pi h \sum_{-\infty}^{\infty} \alpha_i \int_{-\infty}^{t} g(\tau - iT) d\tau\right] \tag{2}$$

with the frequency pulse (see J. B. Anderson, et al., *Digital Phase Modulation*, Plenum, 1986; *Cellular Digital Packet Data System Specification*, Prelim. Release V. 1.0, Jul. 19, 1993):

$$g(t) = \frac{1}{2T}\left[Q\left(2\pi BT\left(\frac{t/T - 1/2}{\sqrt{\ln 2}}\right)\right) - Q\left(2\pi BT\left(\frac{t/T + 1/2}{\sqrt{\ln 2}}\right)\right)\right] \tag{3}$$

where T represents the symbol time (for CDPD, symbol time and bit time are synonymous), E represents the energy per symbol interval, h=0.5 is the modulation index, and the product BT is set to 0.5. The frequency pulse g(t) has been normalized so that the phase response q(t) satisfies conventions followed in the representation of continuous phase modulation (CPM) signals:

$$q(t) = \int_{-\infty}^{t} g(\tau) d\tau = 0.5, \quad t \to \infty \tag{4}$$

Although the frequency pulse g(t) has infinite length, implementations commonly truncate the GMSK filter response to three or four symbol intervals. In addition, the non-causality of the frequency pulse signal of equation (3) is converted into a delay of two symbol intervals. The signal detection technique has been analyzed in additive white Gaussian noise (AWGN) channels and Rayleigh faded channels, since it must work in stationary and mobile environments.

As mentioned above in connection with FIG. 1, in one embodiment the demodulator is assumed to be a limiter-discriminator 14. The demodulated signal is modeled at baseband, after IF filtering, as $$\frac{\dot{Q}I\dot{I}Q}{I^2+Q^2} = \Re\left\{\frac{(I+jQ)(\dot{Q}+j\dot{I})}{I^2+Q^2}\right\} \quad (5)$$

The IF filter 12 chosen for the analysis was a four pole Butterworth filter with cutoff at 15 kHz from the carrier.

The post-detection filter 18 in one presently preferred embodiment is a twelve tap FIR filter at 76.8 kHz sampling rate (corresponding to four samples per symbol interval) with a cutoff of 6 kHz and is roughly matched to the GMSK spectrum. The design of the post-detection filter is not crucial to a discriminator detector implementation of the receiver. Further details of the simulation are described below.

The objective here is to identify a measure that allows one to distinguish between the two hypotheses $H_0$, $H_1$. The limiter-discriminator has the property of converting incident white noise within the receiver bandwidth to a parabolic spectral shape centered around the carrier. Thus, even as the IF filter 12 suppresses incident noise at the band-edges, the limiter-discriminator 14 will have the effect of enhancing those spectral components. If noise alone were passing through the limiter-discriminator, the ratio of spectral components within the matched (post-detection) filter bandwidth to those outside the bandwidth should be smaller than the same ratio calculated for hypothesis $H_1$.

Let $x_k$ represent the output of the limiter-discriminator 14 and let $y_k$ represent the output of the post-detection filter (this may be, e.g., a twelve tap FIR filter with cutoff 6 kHz). The decision metric is then represented by $$\Lambda_N(X) = \frac{\sum_{k=0}^{N} y_{N-k}^2}{\sum_{k=0}^{N} (x_{N-k} - y_{N-k})^2} \quad (6)$$

where $(x_0, x_1, \ldots x_N)$ are the first N samples available to make a decision. The decision delay N was chosen to be fifty bit intervals, or 2.6 ms, and yields acceptable receiver operating characteristics.

Identification of CDPD

The problem of identifying a CDPD signal among all received signals may also be formulated as a hypothesis testing problem. The hypothesis testing problem is formulated as follows. There are two possibilities given that the channel is definitely occupied by some signal:

$H_0$: The channel is occupied by CDPD  (7a)

$H_1$: The channel is not occupied by CDPD.  (7b)

Hypothesis $H_1$ is in turn represented by two cases:

$H_{1a}$: The channel is a voice channel  (8a)

$H_{1b}$: The channel is a control channel.  (8b)

Typically, all $H_{1b}$ cases will be eliminated by the signal detection method described above. This is because the FSK control channel has a wider bandwidth than the CDPD signal. Moreover, the signal will have a strong spectral component at 10 kHz, which will boost the denominator of the metric in equation (6).

The processing techniques of the present invention (in applications involving detection of CDPD) rely on the fact that CDPD uses a digital modulation technique with a fixed data (symbol) rate of 19.2 kbps. As opposed to CDPD, voice communications is through analog FM, and has no fixed signalling clock other than the 6 kHz Supervisory Audio Tone (SAT). Control channels, on the other hand, use Manchester encoded FSK at a data rate of 10 Kbps.

Figure 3A:
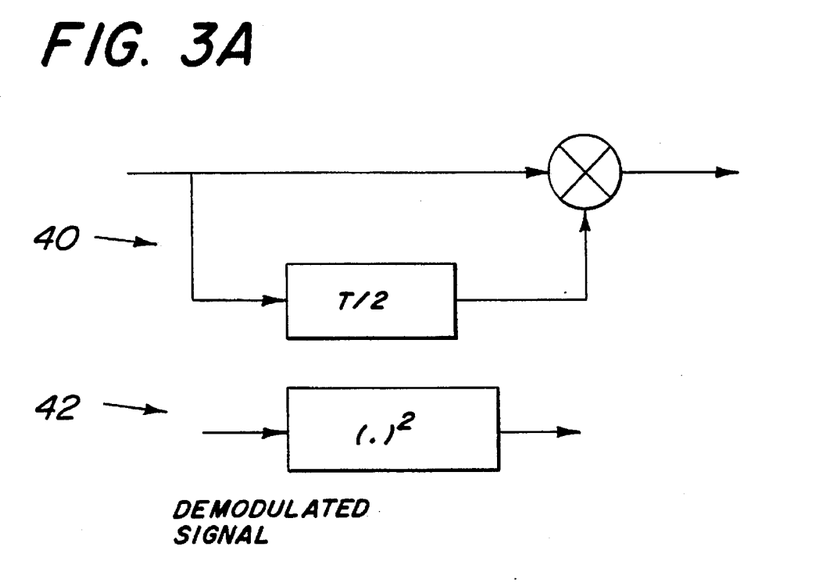
FIG. 3A depicts two non-linear operations, namely, correlation 40 and squaring 42.

The present inventors have studied two processing techniques, aimed at locking on the 19.2 kHz symbol rate of the output of the limiter-discriminator 14. These are schematically depicted in FIG. 3A. The first technique, represented by circuit 40, correlates the output of the discriminator with itself delayed by one-half bit interval; the second technique, represented by block 42 (i.e., a square-law device), squares the signal. It can be shown that both these techniques produce a component at the signalling interval. Assuming random data, whenever the CDPD signal transitions between 0 and 1 it introduces a periodic-like segment in the signal with a frequency of 9.6 kHz. It can be shown that squaring a corrupted periodic waveform with a fundamental frequency $f_0$ will produce a discrete spectral component at the output of the square-law device at the frequency $2f_0$ (see, W. B. Davenport and W. L. Root, *An Introduction to the Theory of Random Signals and Noise*, IEEE press, 1987). Power spectral density calculations for the correlator 40 and square-law device 42 have confirmed this for the CDPD signal. The output of either non-linear device should be filtered at the frequency of interest. A third technique involving taking the fourth power of the matched filter output was rejected since the effect of higher powers of a noisy signal has the effect of noise enhancement, leading to poor performance in moderate to low signal-to-noise environments. The simplest waveform with a fundamental frequency of 19.2 kHz and a sampling rate of 76.8 kHz is the sequence $$c_N = \{1, 0, -1, 0, 1, 0, -1, 0, \ldots -1, 0, 1\}$$

of length N samples. The length N was chosen to be 800 samples, corresponding to 10.41 ms of data. It should be noted that the signal $$s_N = \{0, -1, 0, 1, 0, -1, 0, \ldots 1, 0\}$$

has the same fundamental frequency as, and is orthogonal to, $c_N$. The present invention uses the decision statistic as the variable $$\Lambda = \left[\sum_{k=0}^{N-1} p_k c_k\right]^2 + \left[\sum_{k=0}^{N-1} p_k s_k\right]^2 \quad (9)$$

where p is a vector of suitable length derived from the demodulated signal y processed using the correlator 40 or the square law device 42 (FIG. 3A). Note that this is the DFT of the processed signal at a frequency of one-quarter (¼) the sampling rate or 19.2 kHz if the sampling rate is 76.8 kHz.

Examination of the spectrum of the demodulated signal subject to either of the non-linear processing methods shows that a CDPD signal has a strong component at 19.2 kHz and an FSK signal has a strong component at 20 kHz. This latter component is uncomfortably close to the desired component at 19.2 kHz. In addition, since the demodulated FSK signal has much greater power than the CDPD signal (this is due to the wider deviation of the control signal), the output of the filter should be normalized by the average energy in the signal. This is done as follows: The frequency resolution of the signal $<p, c_N>+j<p, s_N>$ is 76800/N. This corresponds to 96 Hz for a duration of 800 samples. If a smaller block length is selected, say M=40 samples, the frequency resolution would decrease to 1920 Hz. Therefore, a preferred normalization technique uses the decision metric $$A_N(p) = \frac{\left[\sum_{k=0}^{N-1} p_k c_k\right]^2 + \left[\sum_{k=0}^{N-1} p_k s_k\right]^2}{\sum_{m=0}^{M-1}\left\{\left[\sum_{k=0}^{N/M-1} p_k c_k\right]^2 + \left[\sum_{k=0}^{N/M-1} p_k s_k\right]^2\right\}} \quad (10)$$

The effect of the above metric is essentially that of normalizing the energy of a very narrow band filter with the energy at the output of a filter with a broader bandwidth.

Simulation Description

Figure 2A:
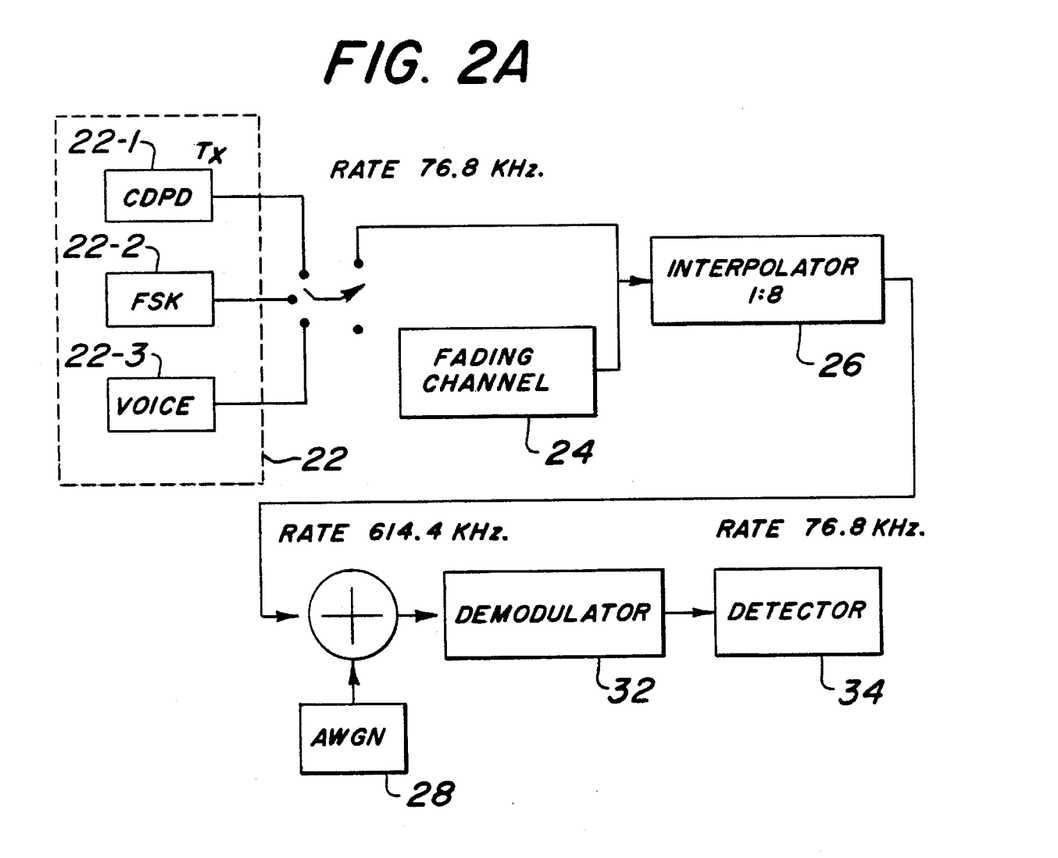
FIG. 2A is a block diagram of the simulator.

The simulator implements the entire transmit chain for all the signals, and part of the receive chain for the CDPD mobile end-station (MES). FIG. 2A is a block diagram of the simulator. Block 22 includes the various radio sources that are likely to produce signals present in the channel. These sources are a CDPD transmitter 22-1, an AMPS control channel transmitter 22-2, and a voice transmitter 22-3. In addition, the simulator includes a block 24 simulating Rayleigh fading, an interpolator 26, a block 28 simulating additive white Gaussian noise, an adder 30, a demodulator 32 (e.g., a limiter-discriminator), and a detector 34. Blocks 32–34 of the simulator correspond to blocks 14–20 of FIG. 1.

Figure 2B:
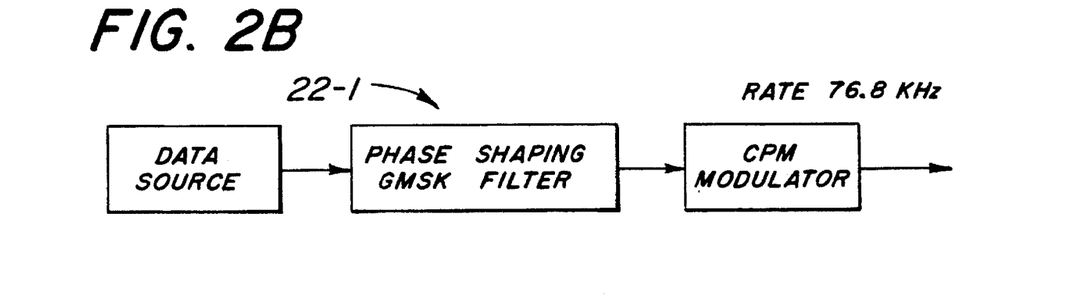
FIGS. 2B, 2C and 2D are block diagrams of a CDPD transmitter 22-1, an AMPS control channel transmitter 22-2, and a voice channel transmitter 22-3, respectively.
Figure 2C:
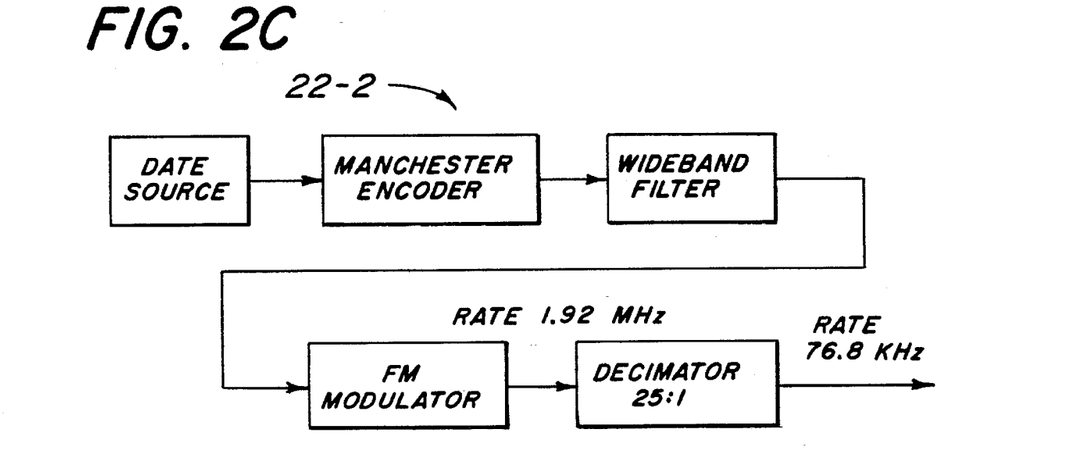
Figure 2D:
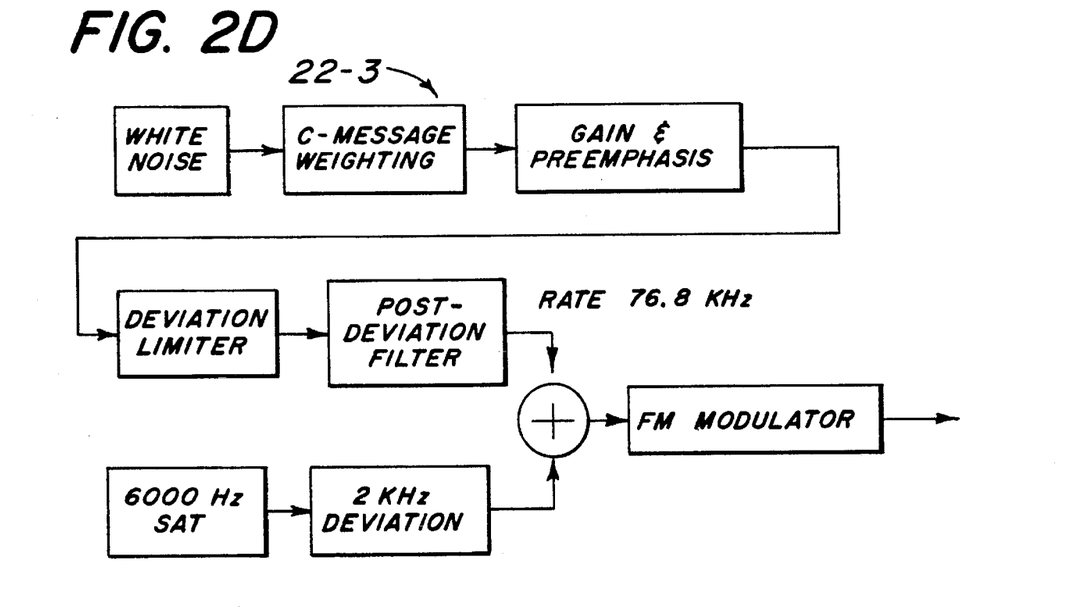

FIGS. 2B, 2C and 2D, are block diagrams of the CDPD transmitter 22-1, the AMPS control channel transmitter 22-2, and the voice channel transmitter 22-3, respectively. As shown, the CDPD transmitter includes a data source, phase shaping GMSK filter, and a CPM modulator. The control channel transmitter 22-2 includes a data source, Manchester encoder, wideband filter, FM modulator, and 25:1 decimeter. The voice channel transmitter 22-3 includes a white noise source, weighting block, gain and preemphasis block, deviation limiter, post-deviation filter, SAT source, 2 kHz deviation block, adder, and FM modulator, configured as shown. The details of these components are not part of the present invention and are not described herein.

As mentioned, the receiver uses a limiter-discriminator 14 (FIG. 1) for demodulation. The front-end filtering in the receiver is a filter derived by scanning the front-end filter used in field trials. The limiter-discriminator is implemented at baseband by means of a phase detector followed by a differentiator. The phase detector implementation requires a high sampling rate, hence the need for the interpolator within the waveform channel. Final signal processing is performed using samples at 76.8 kHz. This amounts to four samples per CDPD symbol interval.

Figure 3B:
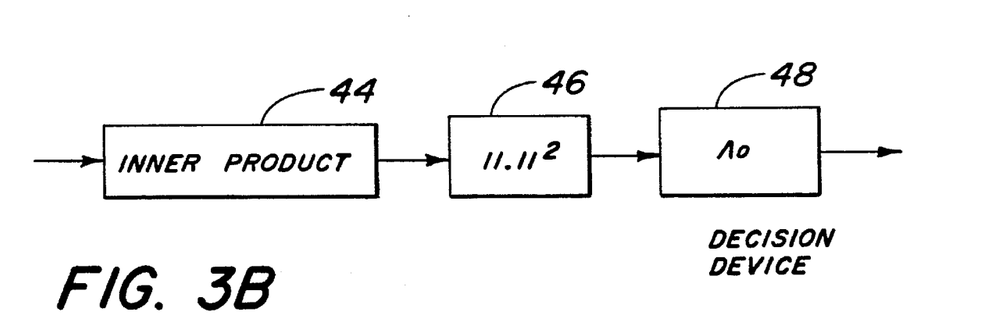
FIG. 3B depicts filtering and thresholding employing an inner product 44, normalization 46, and thresholding 48.

FIGS. 3A and 3B depict the various processing techniques discussed above. The two non-linear operations, depicted in FIG. 3A, are correlation 40 and squaring 42. The filtering and thresholding are depicted in FIG. 3B. The filtering and thresholding operation employs a block 44 for obtaining an inner product, a block 46 for performing normalization, and a decision block 48. Note that, in FIG. 3B, the magnitude is normalized using equation (10).

An inner product is simply the sum of the element-wise product of two vectors (or time sequences). For example, the first term on the numerator of equation 10 is the square of the inner product of vectors p and $c_N$. Normalization is the process by which the energy is the spectral band of interest (i.e., around 19.2 KHz, in this case) is divided by the energy of the signal as a whole to remove gain factors that apply to both energies and can bias the decision, if not normalized. This process is described mathematically by equation 10. Decision is simply the operation where the decision variable (computed in equation 10 in this case) is compared to a threshold and a determination is made in favor of one or the other hypothesis depending on which side of the threshold the decision variable lies.

Results

The inner-product technique is not computation intensive since it implements a Fourier transform at a fixed frequency on a block of data. Tests have indicated that acceptable discrimination between signals is obtainable by processing 10.41 ms of data, corresponding to 200 bits. It is preferable to use the signal detection method described above to shortlist the channels. The processing described above considers the detection and false alarm probabilities in additive white noise and Rayleigh fading. In general, the detection probabilities do not change much between the correlator 40 and square-law device 42. However, the correlator yields lower false alarm probabilities and, therefore, it is better than the square-law device. This is due to the fact that the square-law device implements a memoryless operation whereas correlation has the effect of smoothing out the effects of noise over one-half bit interval.

B. Method 2: Minimum Mean-Squared Error Detection Identification of CDPD

As mentioned above, the CDPD problem may be formulated as a hypothesis testing problem:

$H_0$: The channel is occupied by CDPD, (7a)

$H_1$: The channel is not occupied by CDPD, (7b)

$H_{1a}$: The channel is a voice channel, (8a)

$H_{1b}$: The channel is a control channel. (8b)

In addition, the CDPD signal is unique in having a fixed pulse shape and symbol time. The second inventive method is a Least Mean Squares error approach. It may be applied either recursively or through a block-processing technique.

Simulation Description

As in the first method described above, the simulator implements the entire transmit chain for all the signals and part of the receive chain for a CDPD mobile end-station. The block diagram of the simulator, along with a description of the various radio sources that are likely to be present in the channel, are provided in FIGS. 2A–2D.

As mentioned above, the signal detection problem may be formulated as a hypothesis testing problem stated as the binary hypothesis test:

$H_0: r(t) = n(t)$ (1a)

$H_1: r(t) = F[s(t)] + n(t)$ (1b)

The signal s(t) is a GMSK signal of the form:

$$s(t) = \sqrt{\frac{2E}{T}} \cos\left[2\pi f_c t + 2\pi h \sum_{-\infty}^{\infty} \alpha_i \int_{-\infty}^{t} g(\tau - iT)d\tau\right] \quad (2)$$

with the frequency pulse:

$$g(t) = \frac{1}{2T}\left[Q\left(2\pi BT\left(\frac{t/T - 1/2}{\sqrt{\ln 2}}\right)\right) - \quad (3)$$

$$Q\left(2\pi BT\left(\frac{t/T+1/2}{\sqrt{\ln 2}}\right)\right)\Bigg]$$

where T represents the symbol time, E represents the energy per symbol interval, h=0.5 is the modulation index, and the product BT is set to 0.5. The frequency pulse g(t) has been normalized so that the phase response q(t) satisfies conventions followed in the representation of continuous phase modulation signals.

$$q(t) = \int_{-\infty}^{t} g(\tau)d\tau = 0.5, \quad t \to \infty \tag{4}$$

Although the frequency pulse g(t) has infinite length (support), implementations commonly truncate the GMSK filter to three or four symbol intervals. The non-causality of g(t) is converted into a delay of two symbol intervals. The received signal may be noise n(t) or a combination of signal s(t) and noise. Since there is a possibility that the signal is transmitted or received by a mobile unit, the operator F represents Rayleigh fading. The technique is analyzed in additive white Gaussian noise channels or Rayleigh faded channels, since it should work in stationary and mobile environments.

In one embodiment, the demodulator is assumed to be a limiter-discriminator 14 (FIG. 1) and the demodulated signal is modeled at baseband as in equation (5) above, with the IF filter being a four pole Butterworth filter with cutoff at 15 kHz from the carrier. Final signal processing is performed using samples at 76.8 kHz, which amounts to four samples per CDPD symbol interval. The post-detection filter 18 in one preferred embodiment is a twelve tap FIR filter at a 76.8 kHz sampling rate with a cutoff of 9.6 kHz. This filter is roughly matched to the spectrum of the GMSK frequency pulse.

Figure 4A:
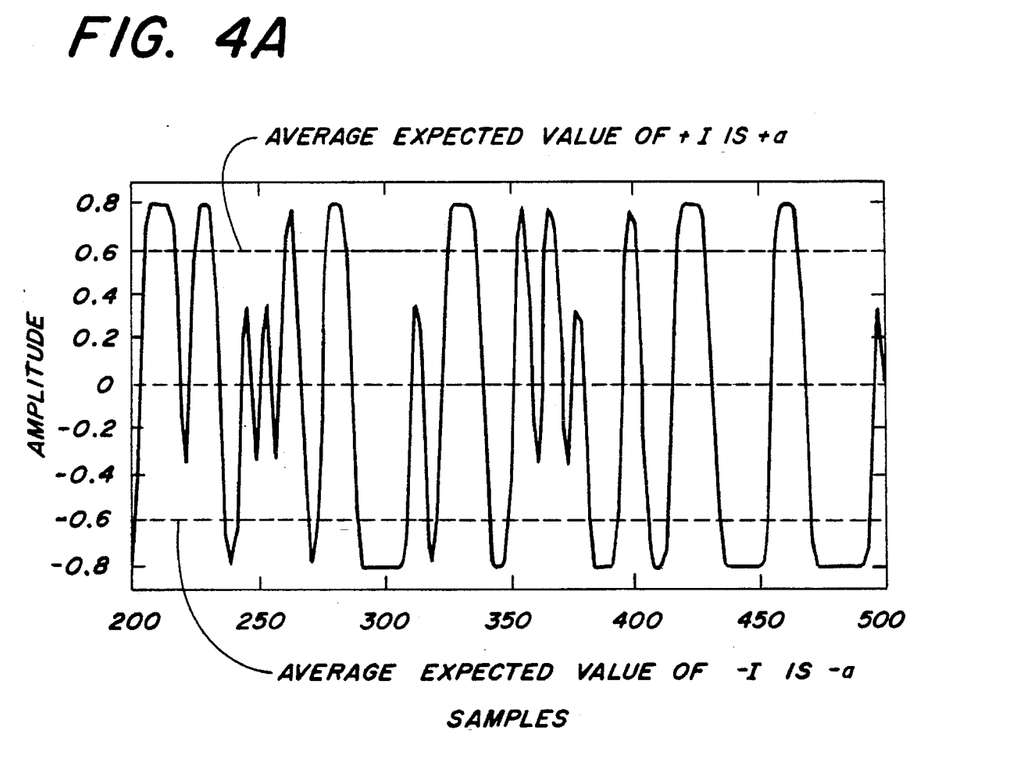
FIG. 4A depicts a typical demodulated signal.
Figure 4B:
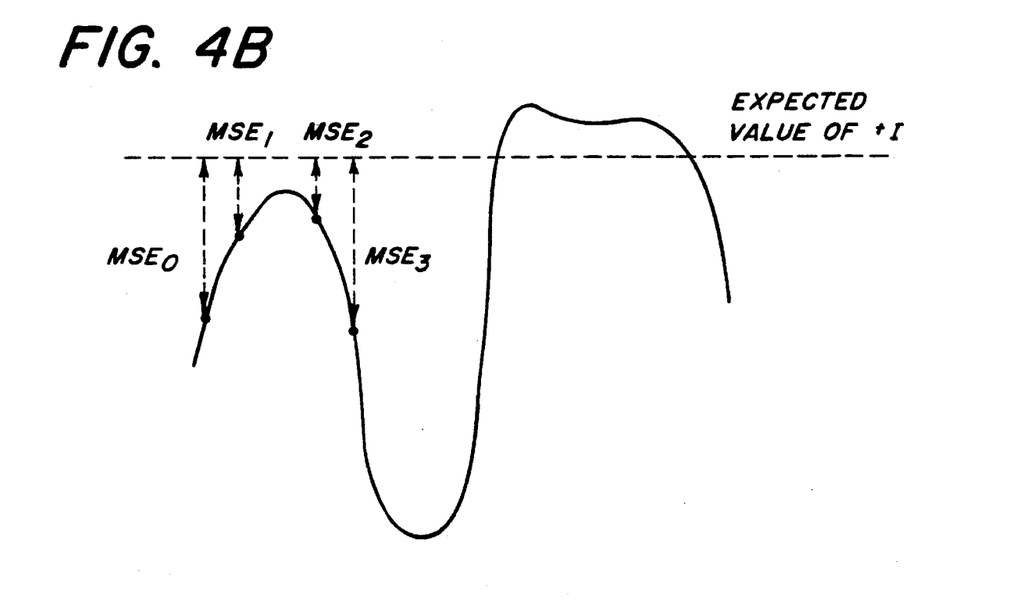
FIG. 4B depicts a waveform and four contributions to the mean-squared error.
Figure 4C:
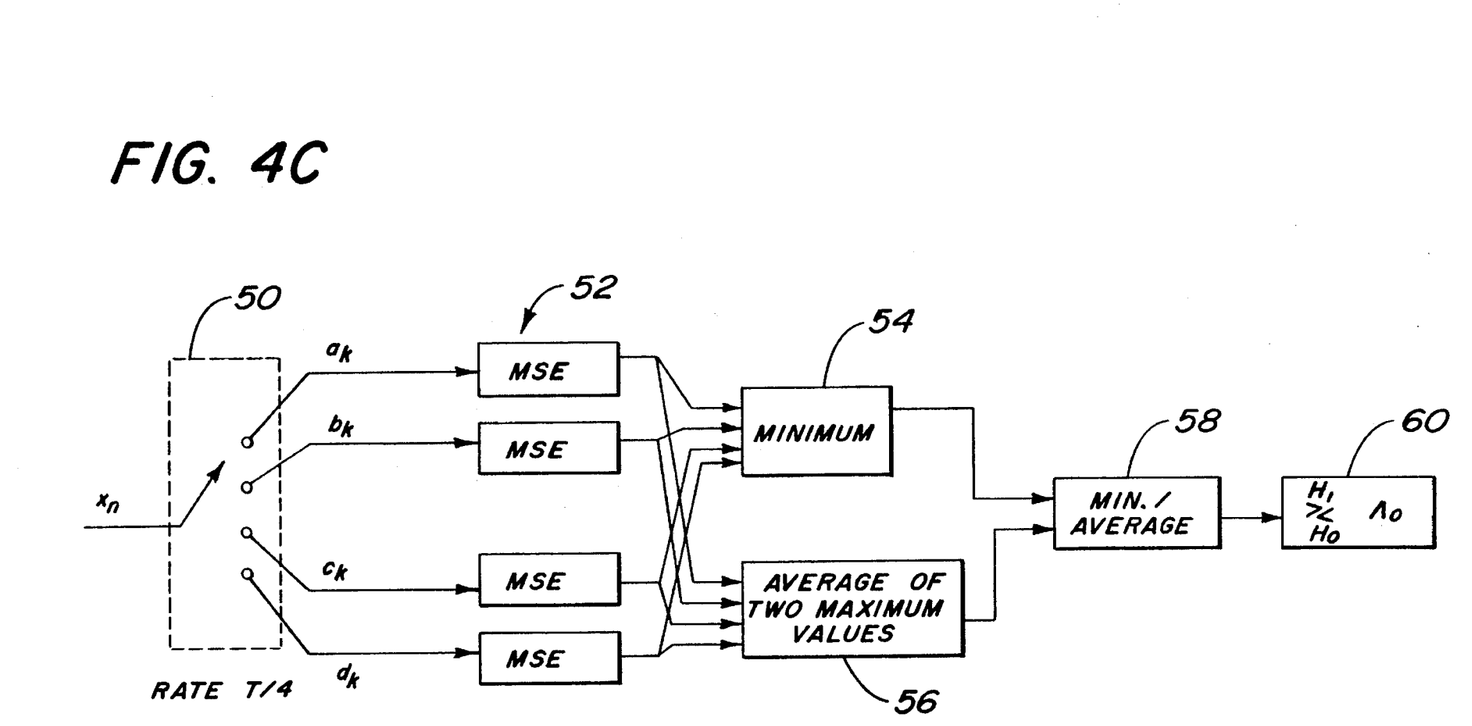
FIG. 4C schematically depicts a processor for performing CDPD signal detection.

FIGS. 4A–4C are referred to below in explaining the MMSE processing technique. FIG. 4A depicts a typical demodulated signal, where the 10 dB point of the post-detection filter 18 (FIG. 1) is 9.6 kHz. FIG. 4B depicts a waveform and the difference (error) between the received signal and the expected value for the four samples in a given symbol. FIG. 4C schematically depicts the processing performed by the identification block 20 (FIG. 1). As shown in FIG. 4C, the CDPD identification block includes a T/4 demultiplexing block, which outputs signals $a_k$, $b_k$, $c_k$, $d_k$. These signals are simply the result of demultiplexing the stream of samples that are obtained by sampling the analog signal at four times per symbol period. That is, first the output of the limiter discriminator is sampled at the rate of 4 samples per symbol period, the samples are filtered using the post detection filter, and are then split into four separate sets before the rest of the processing takes place.

The signals $a_k$, $b_k$, $c_k$, $d_k$ are fed to corresponding mse (mean-squared error) computation blocks 52. The outputs of the mse computation blocks 52 are provided to a block 54 for determining the minimum mse and a block 56 for determining the average of the two maximum mse's. The ratio of the minimum mse to the average of the two maximum mse's is determined by block 58. The output of block 58 is provided to decision block 60, which decides which hypothesis is true, $H_1$ or $H_0$. Block 58 takes as inputs the minimum Mean Square Error and the Average of the two maximum Mean Square Errors and forms the ratio of the two quantities. The following block (decision block 60) compares this ratio (also known as decision variable, denoted by $\lambda 0$ in block 60) to a threshold and decides in favor of a hypothesis depending on the outcome of this comparison.

The peak level of the signal at optimum timing is assumed to be $\pm a$. This embodiment of the invention makes a decision on each sample of the output of the post-detection filter 18. The decision is then used to calculate the mean-squared error with respect to an expected signal level. Hypothesis $H_0$ is declared if the minimum of the four mse's is below a chosen threshold. Before making a decision, the calculated mse is normalized by the average of the two maximum mse values. The result of this method has been compared with the unnormalized metric, as well as another technique that used the average of the three maximum mse values as a normalization factor. The present method yielded faster convergence of results than both of the others. A probable cause for the improvement is illustrated in FIG. 4B. Since two samples within a symbol interval may be close to the optimum sampling point, the contributions to the mean-squared error due to those two points may be close. Thus, inclusion of one of those points in the normalization factor adversely affects the discrimination ability of the method.

Results

Results have been obtained for processing intervals of 2.6 ms and 5.2 ms. The longer processing interval could be used for confirmation of coarse results from a quick pass over all channels of interest with a smaller processing interval. However, there is seen to be a marginal improvement in results at low signal-to-noise ratios, and it may be worth scanning through the whole set again using 2.6 ms of data. A maximum of three passes will increase the probability of detection from 95% to 99.98%. Assume the total number of channels that the mobile end station scans over is 1000. One pass will take a maximum of 2.6 s. Table 1 gives a list of probabilities for interesting events. A nominal probability of detection for one pass over the set of channels is chosen to be 0.95. The simplified scenario in the table does not consider the possibility of false-alarm. The implemented scheme would preferably make a pass over the set of channels, short-listing candidates in the process. A second pass over the short-listed candidates is not expected to add more than 1 second to the processing time, under worst case channel conditions.

TABLE 1

A list of interesting events and corresponding probabilities of detection.

| EVENT | PROBABILITY |
|---|---|
| One pass succeeds | 0.9500 |
| One of three passes succeeds | 0.9998 |
| Detection time <2.6 s | 0.9500 |
| Detection time <5.2 s | 0.9975 |
| Detection time <7.8 s | 0.9998 |

The expected signal value is dependent on the implementation of the limiter-discriminator 14 (FIG. 1). It is recommended that automatic calibration of the scheme be implemented. This calibration could be dynamically done. The mobile end-station (or base station) could recalibrate whenever the system registers on a CDPD channel.

There are two parameters that should be optimized for fine tuning the signal processor. One of them is the bandwidth of the post-detection filter 18 (FIG. 1). This need not be identical to the filter actually used during reception. A wider bandwidth will yield less intersymbol interference but will allow more noise at the filter's output. Since, however, the expected signal value in no noise conditions depends on the amount of intersymbol interference, a slightly wider bandwidth will probably be more effective. The other parameter that needs tuning is the expected signal level ±a. The optimum value of a will be the average peak sample value at the 76.8 kHz rate. For the particular implementation disclosed herein, the value chosen was 0.6. This value will change depending on the implementation.

The threshold choice for a first pass should allow a 20–30% false alarm probability. Such a choice will yield detection probabilities in excess of 98% at all SNR's of interest. On the second pass, the false alarm rate may be greatly reduced.

Figure 5:
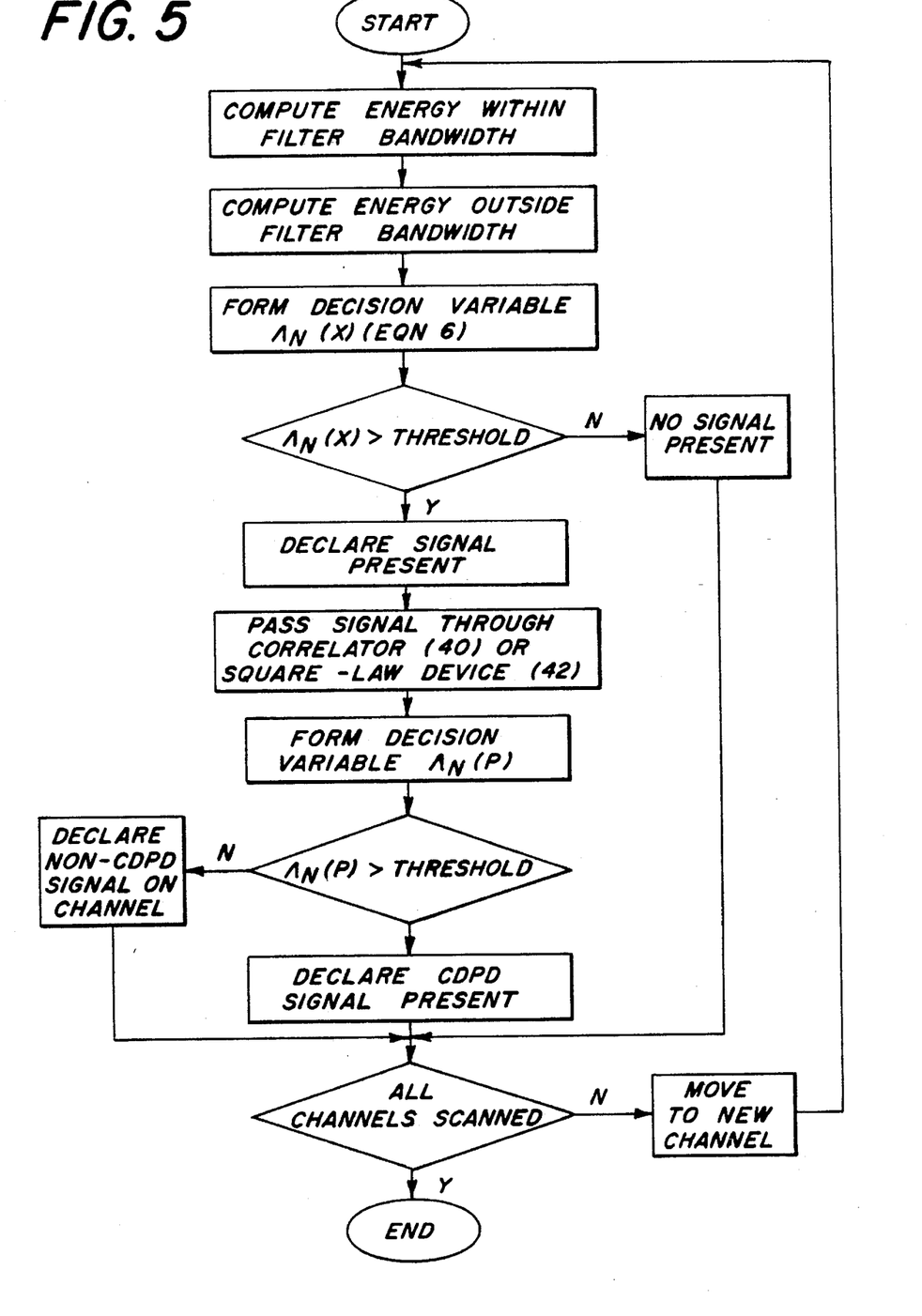
FIG. 5 is a flowchart of the spectral estimation detection method disclosed herein.
Figure 6:
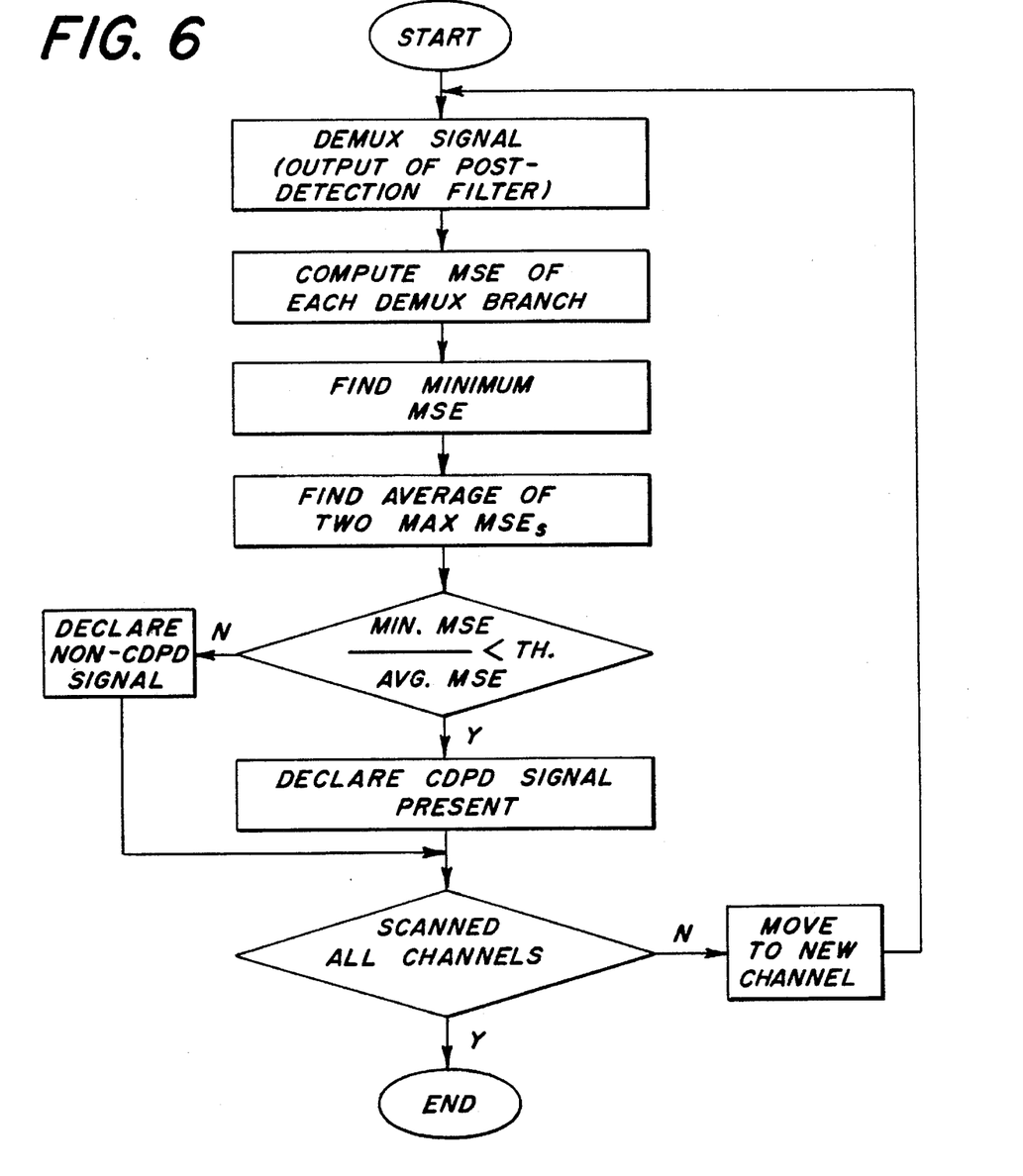
FIG. 6 is a flowchart of the MMSE detection method disclosed herein.

The two inventive methods disclosed herein will now be summarized with reference to FIGS. 5 and 6.

Referring first to FIG. 5, the Spectral Estimation Detection Method begins by computing energy within the filter band width. The energy outside the filter band width is then computed. Next, the decision variable is formed, for example, in accordance with Equation 6. The decision variable is then compared with a threshold. If the decision variable is not greater than the threshold, it is determined that no signal is present. On the other hand, if the decision variable is greater than the threshold, the method declares that a signal is present. Thereafter, the signal is passed through a correlator or a square-law device (for example, the correlator 40 or square-law device 42 of FIG. 3A. Thereafter, a decision variable is formed in accordance with Equation 10. A determination is then made whether the decision variable is greater than a threshold. If not, the signal on the channel is declared a non-CDPD signal. If the decision variable is greater than the threshold, the signal is declared a CDPD signal. All channels are preferably scanned in this manner.

Referring now to FIG. 6, the MSE method begins by demultiplexing the signal output of the post-detection filter 18 (see FIG. 1). Thereafter, the MSE of each demultiplexer branch (see FIG. 4C) is computed. The minimum MSE is then found, and then the average of the two maximum MSEs is found. The ratio of the minimum MSE to the average of the two maximum MSEs is then compared to a threshold. If the ratio is not greater than the threshold, the signal is declared a non-CDPD signal. If the ratio is greater than the threshold, the signal is declared a CDPD signal. Finally, as with the Spectral Estimation Method, all channels are preferably scanned.

The present invention may be embodied in other specific forms without departing from the spirit or essential attributes thereof, and, accordingly, reference should be made to the appended claims, rather than to the foregoing specification, as indicating the scope of the invention and the scope of protection of the following claims.

We claim:

1. A method for detecting an overlay signal in a channel of a primary system, wherein said overlay signal is associated with an overlay system that shares a frequency allocation with the primary system, wherein the primary system has a plurality of channels in which the overlay signal might be present at any given time, and wherein the overlay signal is characterized by a predetermined expected value, the method comprising the steps of:

(a) sampling a received signal in at least one channel to obtain a predetermined number of samples for said at least one channel;

(b) computing an error value for each sample, said error value based on a difference, if any, between a sample value and said predetermined expected value;

(c) determining a minimum error value;

(d) determining a reference value;

(e) determining a ratio of said minimum error value to said reference value; and (f) making a decision as to whether the received signal is an overlay signal on the basis of at least said ratio, wherein said decision is made by comparing said ratio to a threshold value.

2. A method as recited in claim 1, wherein said error values are mean-squared error (mse) values.

3. A method as recited in claim 1, wherein said overlay signal is a Cellular Digital Packet Data (CDPD) signal.

4. A method as recited in claim 3, wherein said primary system is a cellular telephone system.

5. A method as recited in claim 1, wherein said primary system is a cellular telephone system.

6. A method as recited in claim 1, wherein said reference value comprises an average of at least two error values.

7. A system for detecting an overlay signal in a channel of a primary system, wherein said overlay signal is associated with an overlay system that shares a frequency allocation with the primary system, wherein the primary system has a plurality of channels in which the overlay signal might be present at any given time, and wherein the overlay signal is characterized by a predetermined expected value, the system comprising:

(a) means for sampling a received signal in at least one channel to obtain a predetermined number of samples for said at least one channel;

(b) means for computing an error value for each sample, said error value based on a difference, if any, between the sample value and said predetermined expected value;

(c) means for determining a minimum error value;

(d) means for determining an average of at least two error values;

(e) means for determining a ratio of said minimum error value to said average; and (f) means for making a decision as to whether the received signal is an overlay signal on the basis of at least said ratio, wherein said decision is made by comparing said ratio to a threshold value.

8. A system as recited in claim 7, wherein said error values are mean-squared error (mse) values.

9. A system as recited in claim 7, wherein said overlay signal is a Cellular Digital Packet Data (CDPD) signal.

10. A system as recited in claim 9, wherein said primary system is a cellular telephone system.

11. A system as recited in claim 7, wherein said primary system is a cellular telephone system.

* * * * *